Nov. 23, 1954  R. W. MATLOCK ET AL  2,694,924
LAMINATED STRUCTURE TESTER
Filed Nov. 17, 1950
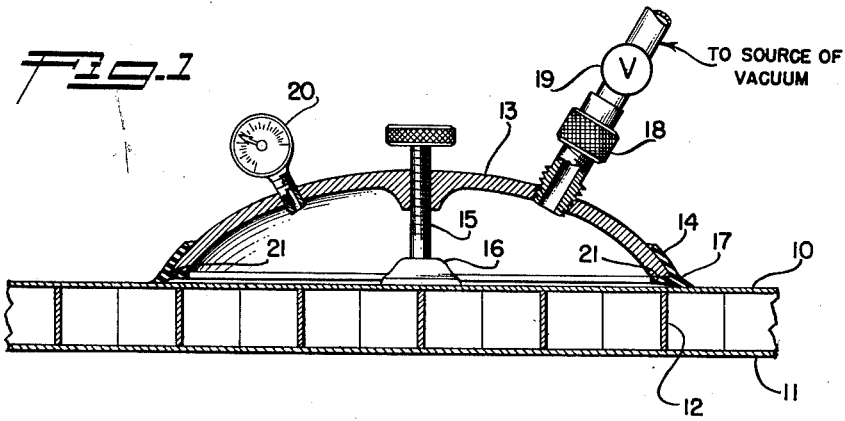
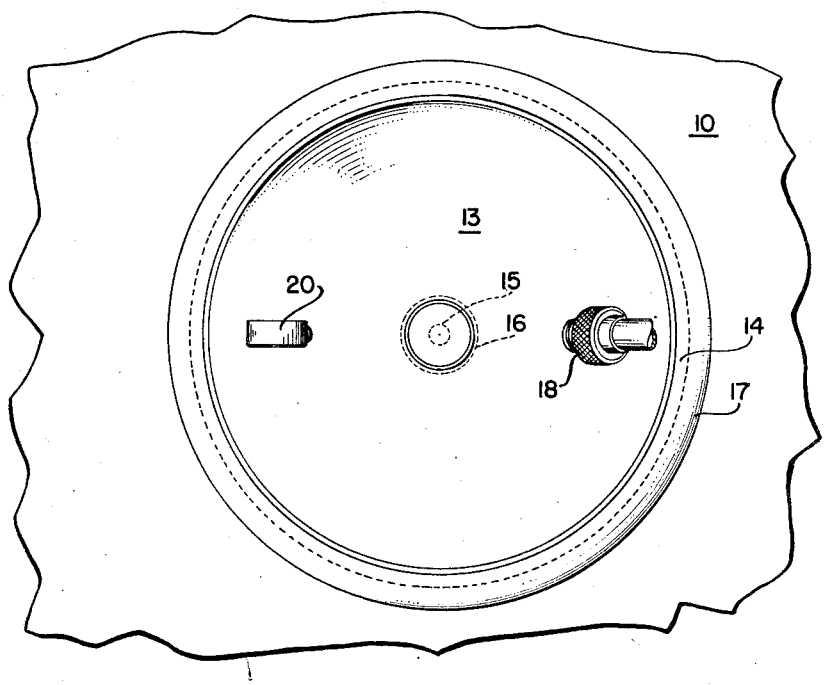
INVENTORS
ROBERT W. MATLOCK
BY   ERNEST A. PHELPS
Agent

United States Patent Office 2,694,924
Patented Nov. 23, 1954

2,694,924

LAMINATED STRUCTURE TESTER

Robert W. Matlock, Van Nuys, and Ernest A. Phelps, North Hollywood, Calif., assignors to Lockheed Aircraft Corporation, Burbank, Calif.

Application November 17, 1950, Serial No. 196,217

3 Claims. (Cl. 73—37)

This invention relates to an improved and simplified apparatus for testing and locating bond defects in laminated structures of the panel or sandwich types.

Such laminated panels or sandwiches are currently in use as structural elements in many fields of use; perhaps the most critical application being in stressed aircraft skins, bulkheads, flooring, and the like. The panels per se form no part of this invention, and embody wide variations in the materials used therein, ranging from ordinary plywood with thick or thin cores to and including one or more layers of cloth, fibre-glass and metal outer plies having core structures of balsa wood, honeycomb arrangements of fibre-glass paper or metal foil, and foamed resins; the cores being bonded to the outer plies. In each case the structural strength depends on the continuity and strength of the bonds between the core and the outer stressed skins of the sandwich or panel, as such skins are highly stressed while the core supports the skins against crippling, and transfers shear loads between the skins, much as the web of an I beam supports the flanges thereof.

Heretofore, the only practical method of testing completed panels for the continuity of the bond comprised going over the entire surfaces of a completed panel by tapping with a light hammer, or similar article, while listening to the sound produced; interruptions or voids in the desired continuous bond being evidenced by a relatively dull sound. Bond strength tests as contemplated herein involve application of a concentrated load at various points over the surface of the panel, weakness in the bond being evidenced by a tearing or cracking sound, indicating failure of the bond or core.

It is, accordingly, an object of this invention to provide an improved and simplified testing device for checking the adhesive bond between the core and skins of laminated structures or sandwiches. The device of this invention is self-contained and readily portable except for the need of a flexible connection to a source of suction, and can be applied at any point on the surface of such a sandwich panel without special support for the latter or imposing an appreciable bending load thereon. Thus the panel may be laid on a work bench, across saw-horses, leaned up against a wall, or be already incorporated in its final location in some article of which it is a component. Also, the operation of the device of this invention tests the bonds between the core and both skins of a panel simultaneously when applied to one side or skin thereof. In terms used by stress engineers in the aircraft industry, the application of a concentrated load to one surface of a panel produces shear stresses in the core that test the bonds between the core and surface layers or skins, which latter carry the major loads in service.

It is a further object of this invention to provide a light and readily handled testing device for the purpose described which can be easily carried and applied to the work, needing only a connection to a source of partial vacuum, which latter could also be portable if no shop lines to a source of such vacuum are available.

Other objects and features of the invention will be readily understood from the following detailed description of a typical preferred form of the invention wherein reference will be made to the accompanying drawings in which:

Figure 1 is a central section through one form of a testing device embodying the features of this invention, shown as in position on a honeycomb core type of panel ready for testing thereon; and Figure 2 is a plan view of the device of Figure 1.

As shown in the drawing, the device of this invention is applied to one surface of a structural panel or sandwich comprising top and bottom skins 10 and 11, and a built up core 12 defining substantially hexagonal cells with their axes normal to the planes of the skins. The core may be formed as corrugated strips adhesively joined together in side by side arrangement and together adhesively bonded on the edges of the strips to the skins 10 and 11. Such structural panels or sandwiches are built of a wide variety of skin, core, and adhesive materials, and form no part of the present invention.

The testing device of this invention comprises a somewhat domed cover member 13 having a flexible peripheral seal 14 of rubber-like characteristics which acts like the edge of a rubber suction cup to seal and hold the cover member to the skin of the panel under test when suction is applied to the space beneath the cover member.

The center of the cover member is threaded to receive the threaded stem 15 of an adjustable loading foot 16 which is adjusted into contact with the panel surface before application of suction under the dome. Such suction tends to seat or flatten the outstanding edge 17 of the seal 14, moving the cover member towards the panel to apply load to the foot 16.

A source of partial vacuum or suction (not shown) is connected to a coupling 18 and valve 19 screwed into a hole in the cover member; and, if desired, a vacuum gage 20 may be provided to indicate the actual vacuum applied beneath the cover member. It will be understood that the maximum load applied to the loading foot will be the panel area inclosed by the cover member multiplied by the differential pressure between atmospheric and suction pressure, as indicated by the gage 20, and this maximum load will only be obtained by such an adjustment of the loading foot so that the cover member does not solidly bottom the underlying portion 21 of the seal 14 against the panel surface. Contra-wise, bottoming of the seal edge 21 against the panel surface limits the concentrated load that may be applied to the loading foot 16, unless the panel is so lightly constructed that it can be slightly drawn up inside the cover member 13 in an annular pattern surrounding the loading foot. The adjustment provided for the loading foot 16 also serves another purpose in that it permits application of the testing device to surfaces opproximating a portion of a sphere, of which radar domes are an example, it being also evident that the device of this invention may be adjusted or formed for testing sandwich or panel constructions which are molded in single and/or double curvatures.

In the use of the device of this invention, assuming that the area of the panel to be tested is accessible to the operator, the instrument is positioned over a given spot and suction applied beneath the cover member 13 by means of the valve 19 connected to a suitable source of suction or partial vacuum. If such source of suction is regulated to the pressure drop desired within the area enclosed by the cover member then no special attention need be paid to the gage 20; otherwise the valve is so controlled as to produce the desired negative pressure reading on the gage. The application of suction in this manner actually causes external atmospheric pressure to push down on the cover member, but it is more convenient to refer to the suction as pulling the cover down to the panel, the force so developed being concentrated on the loading foot 16 unless the seal surface 21 solidly bottoms on the surface of the panel. Proper initial adjustment of the loading foot avoids this variable, and may be necessary if the panel is not stiff enough to prevent deflections thereof under the proof load.

The results of the proof test at a given spot are evidenced by sound or the lack thereof. If the bond between the panel core 12 and the outer skins 10 and 11 is good, no sound will be heard. If weak or failing, cracking or creaking noises will be heard as the panel absorbs the load from the loading foot. If such evidence of bond failure or weakness is heard it is desirable to determine the extent of failure by removing the testing device and tapping the skin with a very light hammer, or similar article, to determine the extent of the bond failure. Unbonded areas give forth a dull, hollow sound, while the sound from a bonded area is sharp and solid. Having determined the extent of the void or bond failure area it is marked on the panel and the testing device is again repeatedly applied with the loading foot around the outside of the perimeter of the failure. If the area of bond failure grows beyond the prescribed permissible limits under such loads, the part should be rejected.

In testing a specific aircraft panel having metal skins and a honeycomb core, the proof load was chosen on the basis of expected service loading at 100 pounds on a loading foot one inch in diameter. The foot was to be applied every two or three inches along the major centerline of the panel, and any indications of failure explored as to area as described above. The panel was rejectable if the area of bond failure was over three square inches, or for various combinations of a plurality of individually smaller failure areas.

It will thus be seen that we have invented an improved and simplified laminated panel bond testing device that is readily portable because it develops its own load in situ and does not impose additional stresses other than the described proof load; can be applied to a laminated panel for testing purposes regardless of the type and location of supports therefor; and is readily designed for and/or adjustable to any desired proof load suited to a particular laminated panel construction, with due regard to the particular materials used in construction of the panel.

Having described only a typical form of the invention we do not wish to be limited to the specific details herein set forth, but wish to reserve to ourselves any variations or modifications that may appear to those skilled in the art and/or fall within the scope of the following claims.

We claim:

1. A testing device for determining the bond strength between the skins and core of a laminated panel of the stressed skin type, including a cover member so arranged as to be positioned against and thereby to define an enclosed area adjacent to one skin of the laminated panel to be tested, a peripheral yielding sealing member carried by the edge of said cover member and so arranged as to make sealing contact between said member and the skin of the panel, a centrally disposed loading foot carried by the cover member and extending therefrom into contact with the skin of said panel, and means to apply a predetermined degree of suction to the enclosed area defined by said cover member, whereby to apply a predetermined concentrated load to said loading foot.

2. A testing device of the type described including a domed cover member, a flexible rubber-like sealing edge attached to the edges thereof, a centrally positioned loading foot disposed within the domed cover member and extending to approximately the plane defined by the edges of said member, and means for creating a partial vacuum beneath said domed cover member when the latter is applied to the surface of an article to be tested.

3. A testing device of the type described including a domed cover member, a flexible rubber-like sealing edge attached to the edges thereof, a centrally positioned loading foot disposed within the domed cover member and extending to approximately the plane defined by the edges of said member, means for creating a partial vacuum beneath said domed cover member when the latter is applied to the surface of an article to be tested, and pressure gage means in communication with the interior of the dome for determining the load produced on said loading foot by the application of suction beneath the cover member.

References Cited in the file of this patent

UNITED STATES PATENTS

| Number | Name | Date |
|---|---|---|
| 1,723,636 | Tuckerman et al. | Aug. 6, 1929 |
| 2,453,338 | Pajak | Nov. 9, 1948 |
| 2,506,048 | Van Den Akker | May 2, 1950 |
| 2,512,134 | Baule | June 20, 1950 |

FOREIGN PATENTS

| Number | Country | Date |
|---|---|---|
| 445,761 | Great Britain | Apr. 17, 1936 |